US008807375B2

United States Patent
Nicosia et al.

(10) Patent No.: US 8,807,375 B2
(45) Date of Patent: Aug. 19, 2014

(54) FLUSH-MOUNT FUEL CAP WITH VALVE

(71) Applicants: Tony Nicosia, Brookfield, WI (US); Craig DeRuyter, Belgium, WI (US); Ken Dietzler, Milwaukee, WI (US); Joerg Lienenkamp, Witten-Bommern (DE)

(72) Inventors: Tony Nicosia, Brookfield, WI (US); Craig DeRuyter, Belgium, WI (US); Ken Dietzler, Milwaukee, WI (US); Joerg Lienenkamp, Witten-Bommern (DE)

(73) Assignees: Harley-Davidson Motor Company Group, LLC, Milwaukee, WI (US); Gaslock GmbH, Iserlohn (DE)

( * ) Notice: Subject to any disclaimer, the term of this patent is extended or adjusted under 35 U.S.C. 154(b) by 0 days.

(21) Appl. No.: 13/756,647

(22) Filed: Feb. 1, 2013

(65) Prior Publication Data
US 2013/0200078 A1    Aug. 8, 2013

Related U.S. Application Data

(63) Continuation of application No. 11/427,813, filed on Jun. 30, 2006, now abandoned.

(51) Int. Cl.
*B65D 51/16*    (2006.01)
*B60K 15/04*    (2006.01)
*B62J 35/00*    (2006.01)

(52) U.S. Cl.
CPC ............. *B60K 15/0406* (2013.01); *B60K 15/04* (2013.01); *B62J 35/00* (2013.01)
USPC ........................... 220/374; 220/293; 220/86.2

(58) Field of Classification Search
CPC .. B65D 51/16; B65D 50/061; B60K 15/0406; B60K 15/05
USPC ....... 220/DIG. 33, DIG. 32, 255, 86.2, 203.1, 220/203.23, 246, 374; 180/286, 69.4, 69.5
See application file for complete search history.

(56) References Cited

U.S. PATENT DOCUMENTS

| 3,815,776 A | 6/1974 | MacMillan |
| 4,133,346 A | 1/1979 | Smith et al. |
| 4,312,649 A | 1/1982 | Fujii et al. |

(Continued)

FOREIGN PATENT DOCUMENTS

| JP | 55101679 | 7/1980 |
| JP | 59175049 | 11/1984 |

(Continued)

OTHER PUBLICATIONS

Custom Chrome, 1989 Catalog Jan. 1, 1989, pp. 395-399.

(Continued)

*Primary Examiner* — Robert J Hicks
*Assistant Examiner* — Kareen Rush
(74) *Attorney, Agent, or Firm* — Michael Best & Friedrich LLP

(57) ABSTRACT

The present invention provides a fuel cap adapted to close an inlet of a fuel tank. The fuel cap includes a body portion adapted to engage the inlet of the fuel tank. The body portion defines a central axis. The fuel cap also includes a valve coupled to the body portion. The valve selectively allows an airflow through the body portion. The fuel cap further includes a cap cover coupled to the body portion and movable along the central axis relative to the body portion.

21 Claims, 7 Drawing Sheets

(56) References Cited

U.S. PATENT DOCUMENTS

| | | | |
|---|---|---|---|
| 4,653,711 A | | 3/1987 | Marshell |
| 4,666,058 A | | 5/1987 | Harris |
| 4,693,393 A | * | 9/1987 | DeMinco et al. ............ 220/374 |
| 4,807,472 A | | 2/1989 | Brown et al. |
| 4,811,763 A | | 3/1989 | Kupske |
| 4,887,733 A | * | 12/1989 | Harris ...................... 220/203.06 |
| 5,158,123 A | | 10/1992 | Senko |
| 5,167,340 A | | 12/1992 | Shaw |
| 5,627,351 A | | 5/1997 | Okuma et al. |
| 6,209,745 B1 | | 4/2001 | Jansson |
| 6,286,704 B1 | | 9/2001 | Harris |
| 6,349,842 B1 | | 2/2002 | Reutter |
| 6,648,160 B2 | | 11/2003 | Hotch |
| 6,745,914 B2 | | 6/2004 | Hagano et al. |
| 6,983,814 B2 | | 1/2006 | Armstrong et al. |
| 8,087,529 B2 | * | 1/2012 | Koerber ................... 220/203.22 |
| 8,353,418 B2 | * | 1/2013 | Bork ....................... 220/203.26 |
| 2002/0158072 A1 | | 10/2002 | Hotch |

FOREIGN PATENT DOCUMENTS

| | | |
|---|---|---|
| JP | 61200074 | 9/1986 |
| JP | 62059181 | 3/1987 |
| JP | H034627 | 2/1991 |
| JP | 361496 | 6/1991 |
| JP | 03148390 | 6/1991 |
| JP | 05246367 | 9/1993 |
| JP | 05305889 | 11/1993 |
| JP | H07228281 | 8/1995 |
| JP | 2508486 | 8/1996 |
| JP | 9226814 | 9/1997 |
| JP | 2000344166 | 12/2000 |
| JP | 2002347454 | 12/2002 |
| JP | 2003040312 | 2/2003 |

OTHER PUBLICATIONS

Custom Chrome Chrome Specialties Product Catalog, 2003, LED Fuel Gauge Gas Caps by Landmark, p. 16.48.

V-Twin Manufacturing Product Reference Guide, 2003, Gas Tank Fuel Gauge, p. 841.

Biker's Choice Handbook, 2002, Landmark Paint Protector Gas Caps with LED Fuel Gauges, p. 431 and Maximum Multi-Function Gauge Mirror System, p. 440.

Office Action from the Japanese Patent Office for Application No. 2007/172588 dated Dec. 18, 2012 (Original and English Translation, 7 pages).

Office Action from the Japanese Patent Office for Application No. 2007/172588 dated Mar. 27, 2012 (Original and English Translation, 9 pages).

* cited by examiner

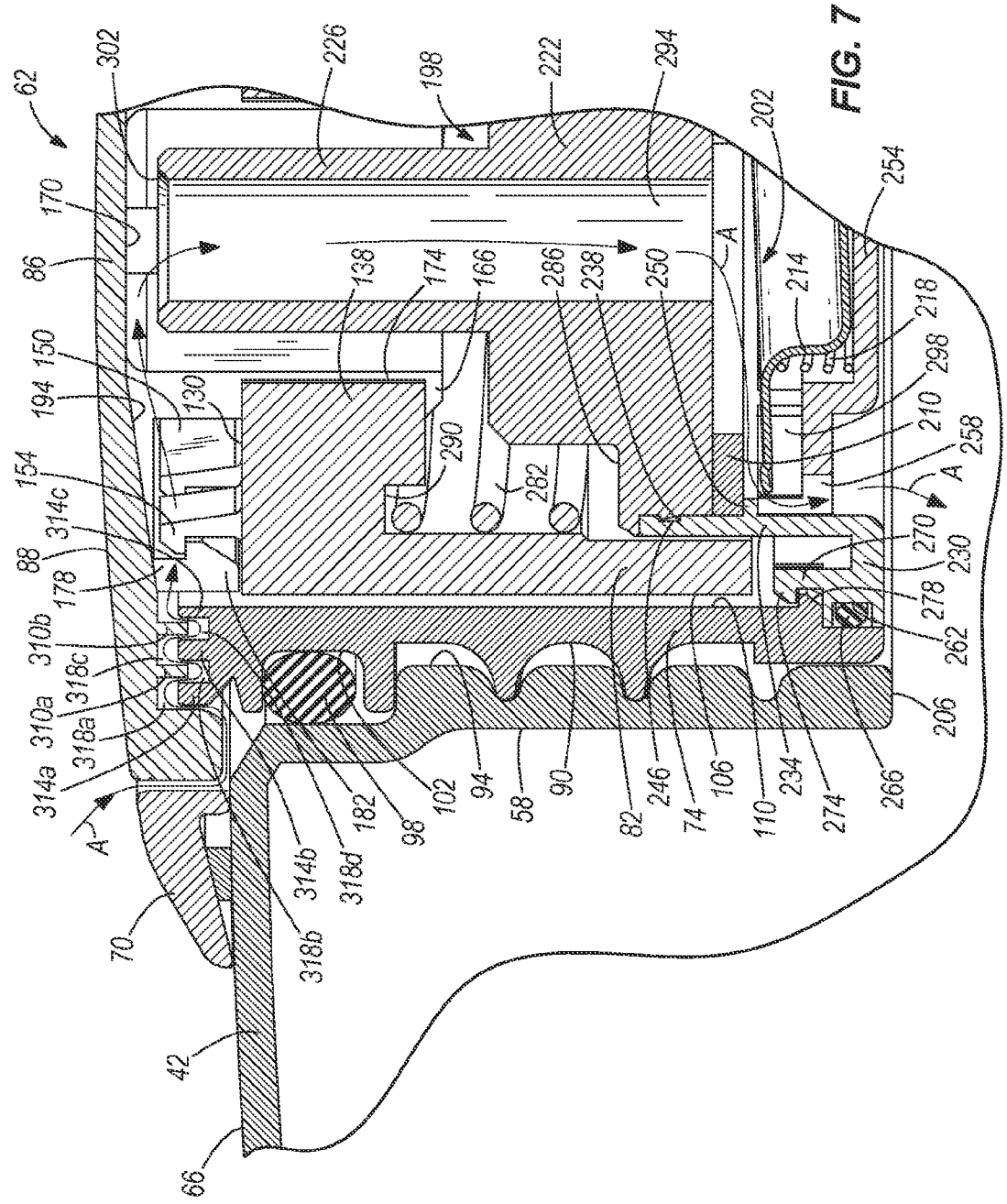

FLUSH-MOUNT FUEL CAP WITH VALVE

RELATED APPLICATIONS

This application is a continuation of co-pending U.S. patent application Ser. No. 11/427,813 filed Jun. 30, 2006, the entire content of which is incorporated herein by reference.

FIELD OF THE INVENTION

The present invention relates to fuel caps, and more particularly to fuel caps for use with vehicles and engine-driven equipment.

BACKGROUND OF THE INVENTION

Motorcycle fuel caps often include check valves through which an airflow may be drawn to replace the volume of used fuel in a fuel tank. Such check valves are often positioned near the top of the fuel caps, or at least closer to the top of the fuel caps than the bottom of the fuel caps. Positioning the check valves near the top of the fuel caps is often desired to locate the check valves above an upper surface of the fuel tanks to prevent liquid "runoff" (e.g., rain) on the fuel tanks from entering the fuel tank with the airflow. Motorcycle fuel caps often include "drip edges" under which the airflow must first pass before being upwardly redirected to enter the check valves. The drip edge on the fuel caps functions as a barrier to prevent liquids from coming into contact with the check valve and entering the fuel tank.

SUMMARY OF THE INVENTION

The present invention provides, in one aspect, a fuel cap adapted to close an inlet of a fuel tank. The fuel cap includes a body portion adapted to engage the inlet of the fuel tank. The body portion defines a central axis. The fuel cap also includes a valve coupled to the body portion. The valve selectively allows an airflow through the body portion. The fuel cap further includes a cap cover coupled to the body portion and movable along the central axis relative to the body portion.

The present invention provides, in another aspect, a fuel tank assembly including a fuel tank having a fuel inlet in an upper surface of the fuel tank and a fuel cap engageable with the fuel inlet. The fuel cap includes a valve for selectively allowing an airflow through the fuel cap. An upper portion of the fuel cap is substantially aligned with the upper surface of the fuel tank when the fuel cap is engaged with the fuel inlet. The valve is positioned below the upper surface of the fuel tank when the fuel cap is engaged with the fuel inlet.

The present invention provides, in yet another aspect, a fuel cap adapted to close an inlet of a fuel tank. The fuel cap includes a body portion adapted to engage the inlet of the fuel tank. The body portion defines a central axis. The fuel cap also includes a movable portion coupled to the body portion and movable along the central axis relative to the body portion. The movable portion includes a passageway therethrough. The fuel cap further includes a valve coupled to the body portion. The valve selectively allows an airflow through the body portion and the passageway of the movable portion.

Other features and aspects of the invention will become apparent by consideration of the following detailed description and accompanying drawings.

BRIEF DESCRIPTION OF THE DRAWINGS

FIG. 7 is a partial cutaway view of a fuel tank and the fuel cap of FIG. 2, illustrating the fuel cap in the retracted position closing a fuel inlet in the fuel tank.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
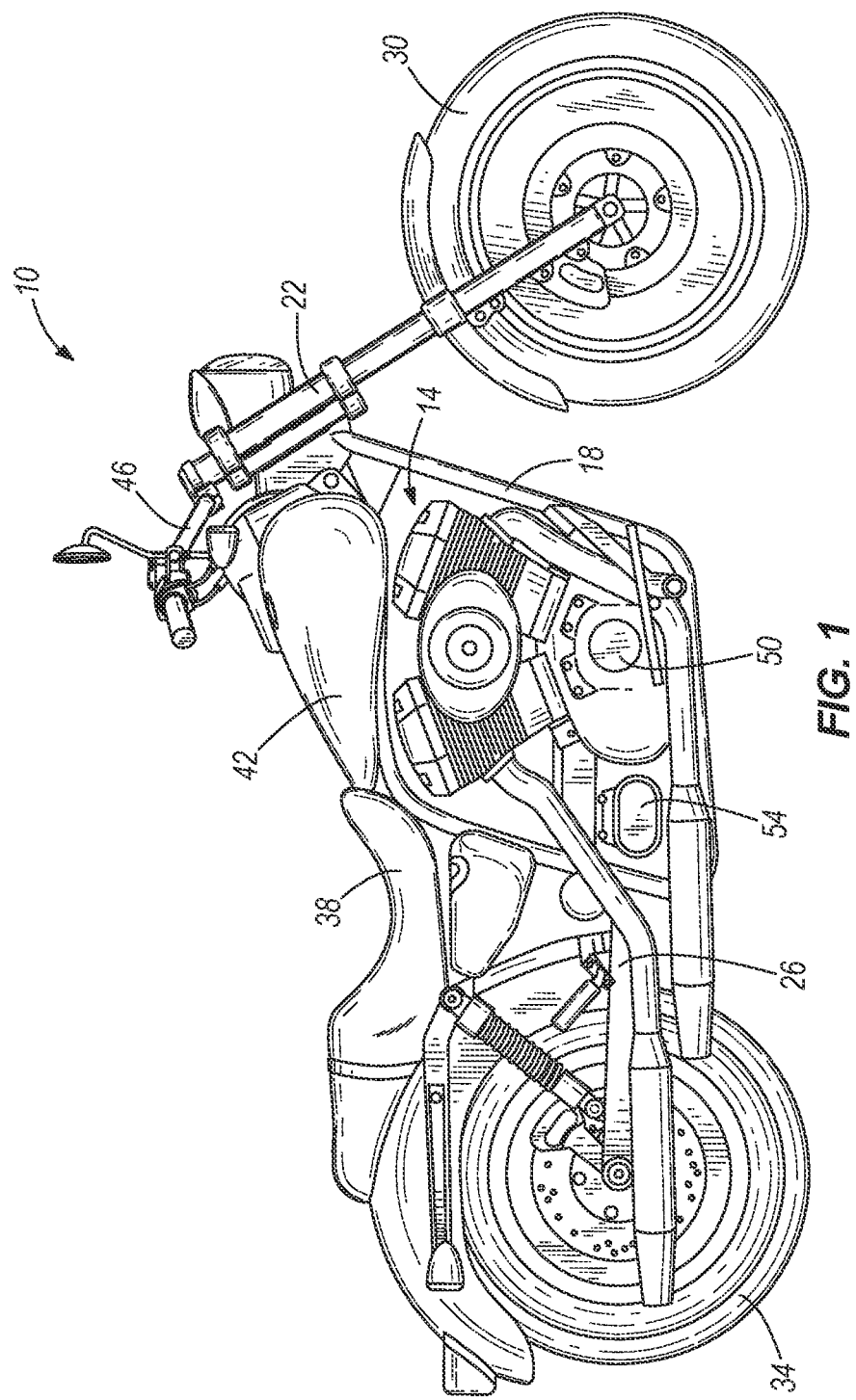
FIG. 1 is a side view of a motorcycle including a fuel cap embodying the present invention.

FIG. 1 illustrates a motorcycle 10 including a drive assembly 14, a frame 18, a front fork assembly 22, a swing arm or rear fork assembly 26, a front wheel 30, a rear wheel 34, a seat 38, and a fuel tank 42. The frame 18 supports the drive assembly 14, the front fork assembly 22, the rear fork assembly 26, the seat 38, and the fuel tank 42. The front fork assembly 22 is pivotally supported at a front end of the motorcycle 10 and supports the front wheel 30. The front fork assembly 22 includes a pair of handle bars 46 for steering the motorcycle 10. The rear fork assembly 26 is coupled to the frame 18 at a rear end of the motorcycle 10 and rotatably supports the rear wheel 34. The seat 38 is coupled to the frame 18 and is configured for supporting a rider. The fuel tank 42 is supported by the frame 18 and provides fuel to the drive assembly 14.

The drive assembly 14 is preferably coupled to the frame 18 beneath the seat 38 between the front wheel 30 and the rear wheel 34 of the motorcycle 10. With continued reference to FIG. 1, the drive assembly 14 includes an engine 50 and a transmission 54. The engine 50 and the transmission 54 comprise distinct, independent components of the drive assembly 14. The engine 50 preferably comprises a V-twin engine 50 supported by the frame 18 forward of the transmission 54. The engine 50 includes an output shaft (not shown), such as a crankshaft, which includes a primary drive sprocket (not shown) for driving a primary chain (not shown) in a conventional manner to power the transmission 54.

Figure 8A:
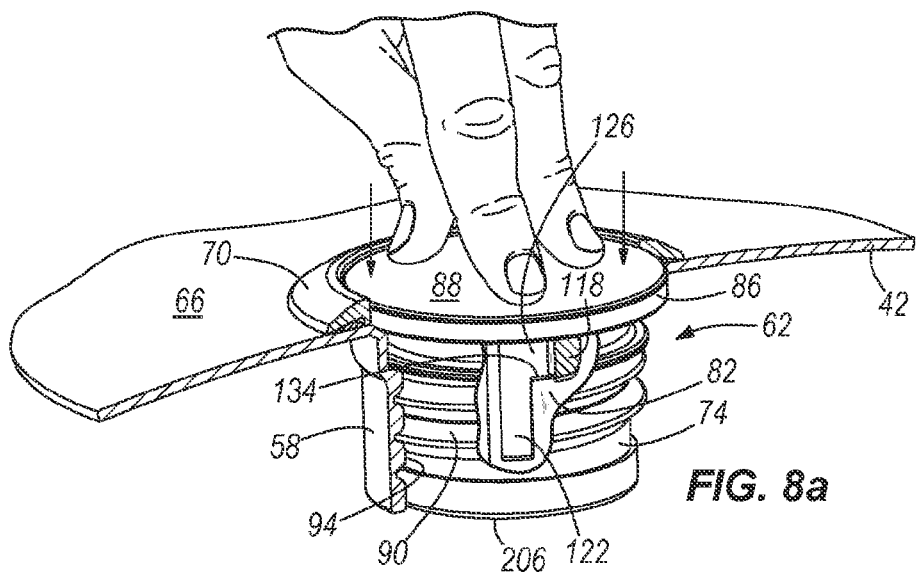
FIGS. 8a-8c are partial cutaway views of the fuel tank and the fuel cap of FIG. 2, illustrating the fuel cap being actuated from its retracted position to its extended position for removal from the fuel inlet.
Figure 8B:
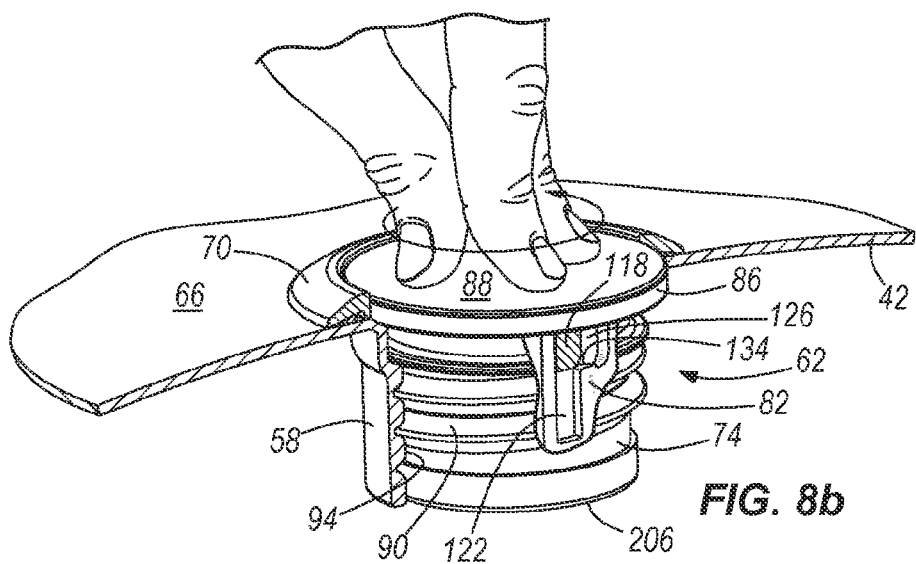
Figure 8C:
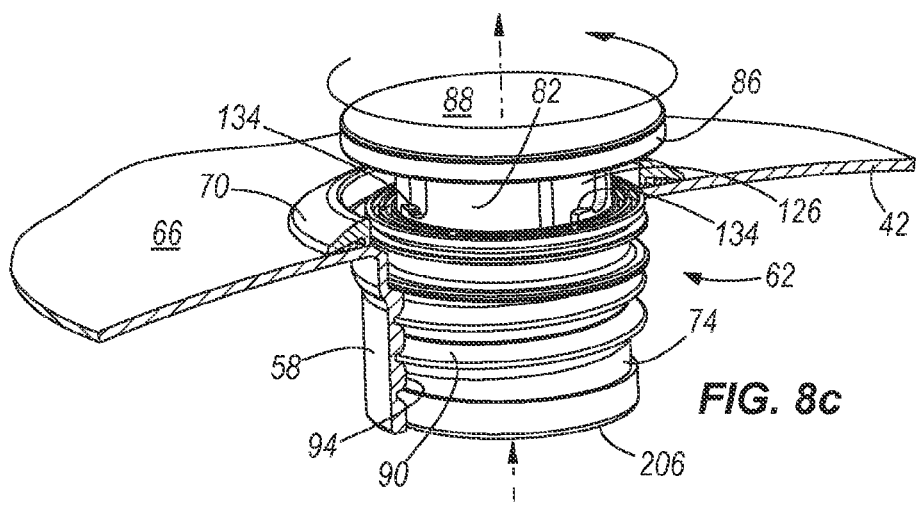

With reference to FIGS. 7-8c, the fuel tank 42 includes a fuel inlet 58 that can be selectively closed by a fuel cap 62. This style of fuel cap 62 is generally known as a "flush-mount" fuel cap 62 because an upper portion of the fuel cap 62 generally follows the contour of an upper surface 66 of the fuel tank 42 and the contour of a bezel 70 coupled to the fuel tank 42 and surrounding the fuel inlet 58. As shown in FIG. 7, although the upper portion of the fuel cap 62 is not perfectly aligned with the upper surface 66 of the fuel tank 42, the upper portion of the fuel cap 62 is substantially aligned with the upper surface 66 of the fuel tank 42 taking into consideration that the bezel 70 is effectively an extension of the upper surface 66 of the fuel tank 42, providing a substantially smooth transition from the upper surface 66 to the upper portion of the fuel cap 62.

Figure 2:
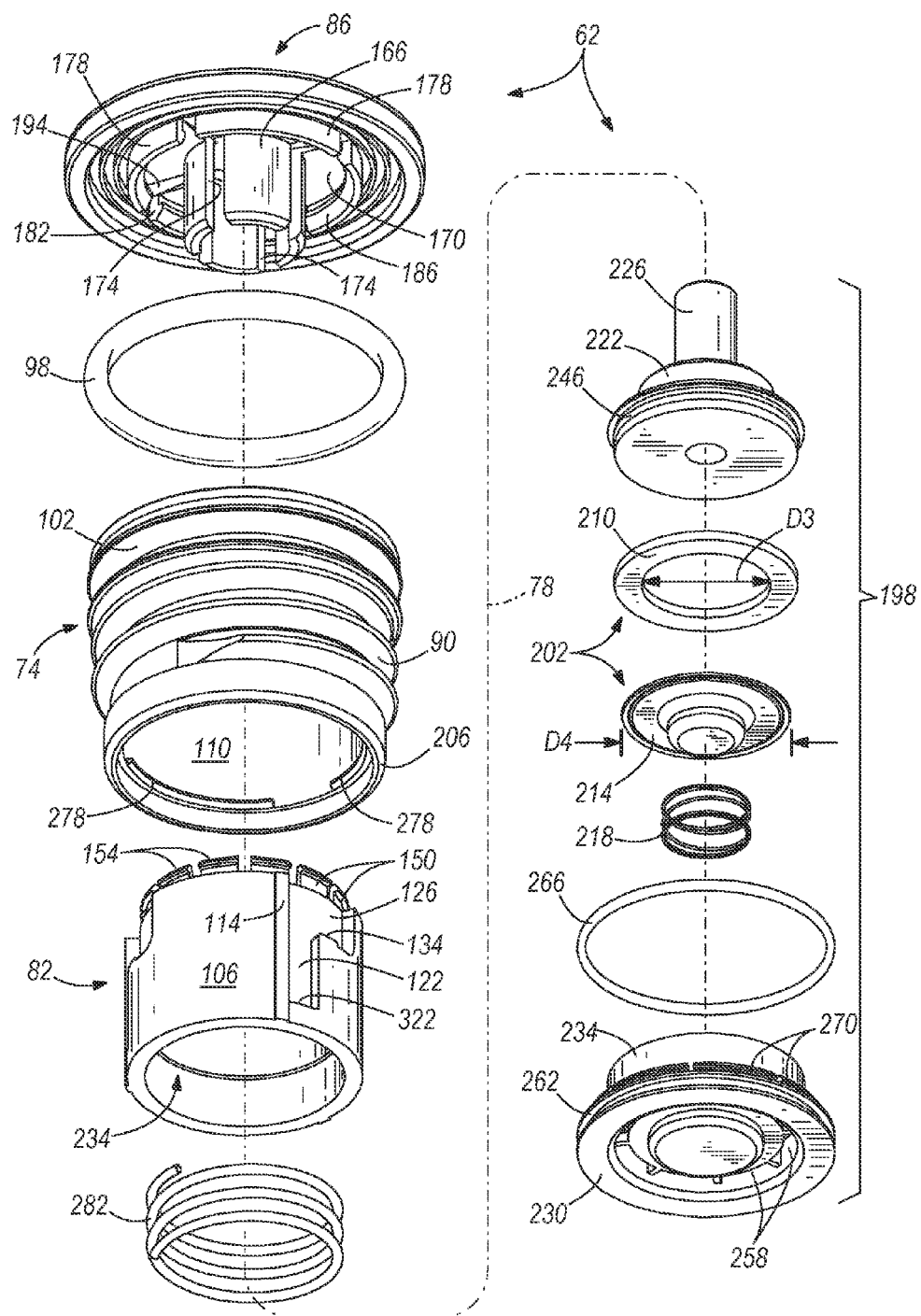
FIG. 2 is an exploded view of the fuel cap of FIG. 1.

With reference to FIG. 2, an exploded perspective view of the fuel cap 62 is shown. The fuel cap 62 generally includes a body portion 74 having a central axis 78, a movable or retractable portion 82 coupled to the body portion 74 and movable relative to the body portion 74 along the central axis 78, and a cap cover 86 coupled to the retractable portion 82 and movable with the retractable portion 82 relative to the body portion 74. To achieve the flush mounting with the bezel 70 and/or upper surface 66 of the fuel tank 42, the cap cover 86 and retractable portion 82 are axially movable between an extended position (see FIG. 5), in which the cap cover 86 is substantially above the upper surface 66 of the fuel tank 42, and a retracted position (see FIG. 6), in which an upper surface 88 of the cap cover 86 generally follows the contour of the bezel 70, or alternatively the upper surface 66 of the fuel tank 42.

With reference to FIG. 2, the body portion 74 includes external threads 90 configured to engage corresponding internal threads 94 in the fuel inlet 58 (see also FIGS. 7-8c). An O-ring 98 is positioned in a circumferential groove 102 formed near an upper end 104 of the body portion 74 to provide a seal between the body portion 74 and the fuel inlet 58 when the fuel cap 62 is threaded into the fuel inlet 58. Alternatively, other types of resilient seals may be utilized in place of the O-ring 98 to seal the fuel cap 62 to the fuel inlet 58.

Figure 6:
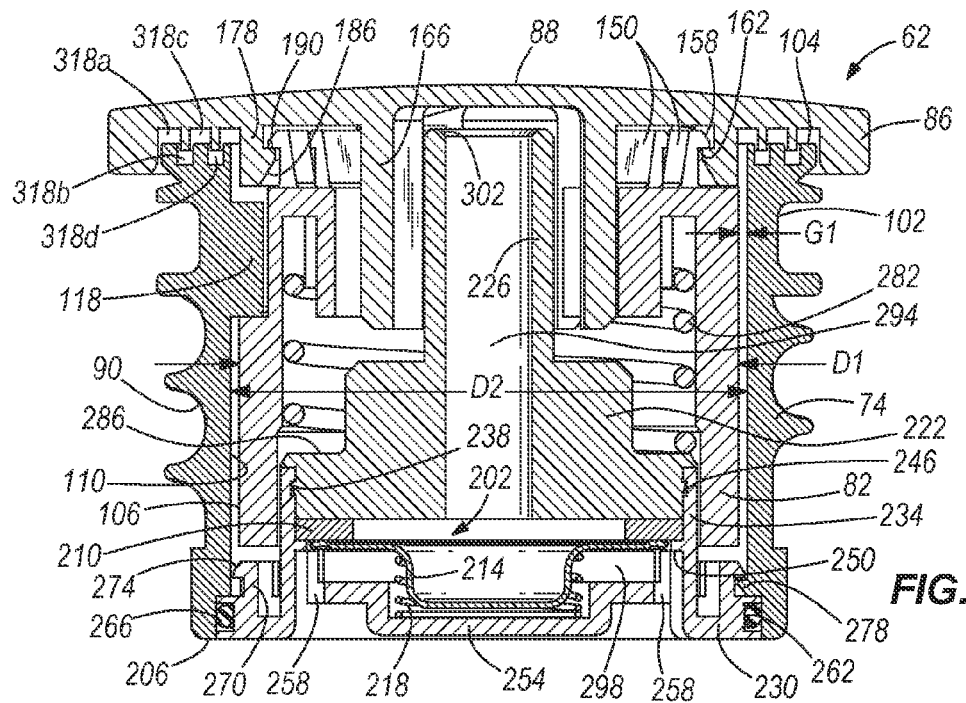
FIG. 6 is an assembled cross-sectional view taken through line 6-6 in FIG. 4, illustrating the fuel cap in a retracted position.

With reference to FIG. 6, the retractable portion 82 has an outer diameter D1 less than an inner diameter D2 of the body portion 74, allowing the retractable portion 82 to retract into or nest with the body portion 74. A radial gap G1 between an outer peripheral surface 106 of the retractable portion 82 and an inner peripheral surface 110 of the body portion 74 is sufficiently large to permit free movement of the retractable portion 82 within the body portion 74. With reference to FIG. 2, however, a plurality of axially-extending guide members 114 are raised from the outer peripheral surface 106 of the retractable portion 82 to engage the inner peripheral surface 110 of the body portion 74 to substantially align the retractable portion 82 with the central axis 78. In the illustrated construction of the fuel cap 62, the retractable portion 82 includes three guide members 114 spaced equi-angularly about the outer peripheral surface 106 of the retractable portion 82. Alternatively, the retractable portion 82 may utilize more than three guide members 114.

Figure 5:
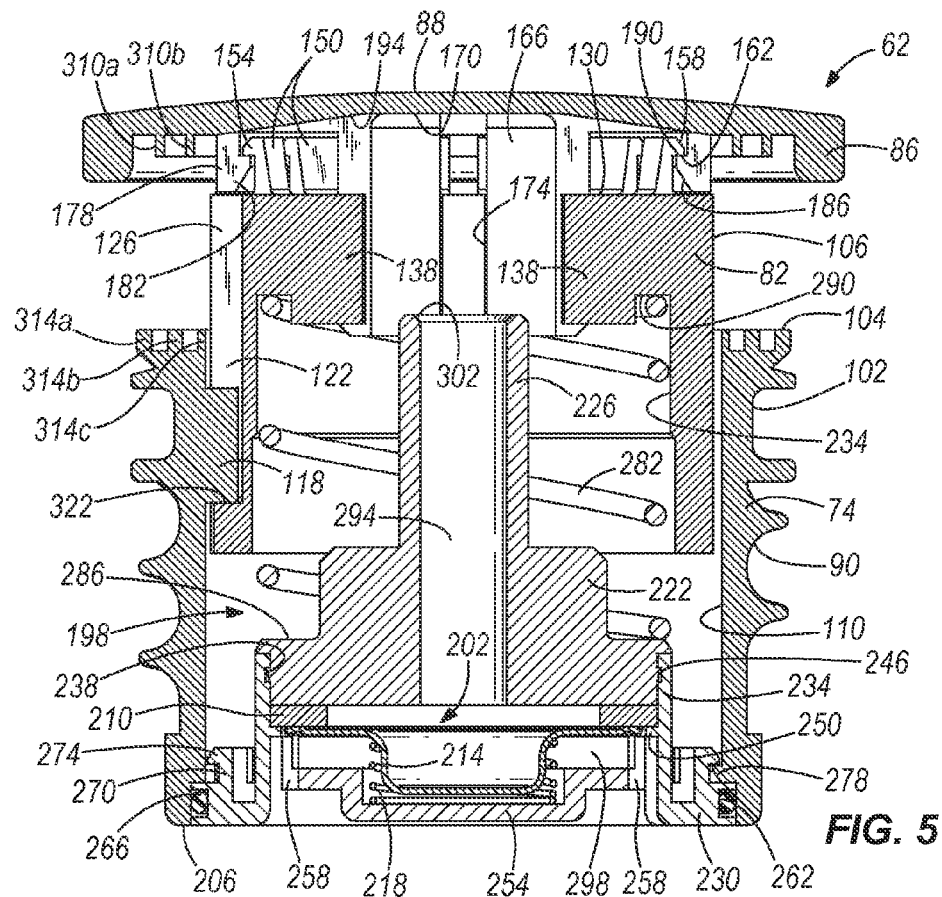
FIG. 5 is an assembled cross-sectional view taken through line 5-5 in FIG. 4, illustrating the fuel cap in an extended position.

With reference to FIGS. 5 and 6, the body portion 74 includes a plurality of internal projections or keys 118 extending radially inwardly toward the central axis 78. The keys 118 are configured to engage corresponding grooves or keyways 122 in the retractable portion 82 (see also FIGS. 2, 3, 8a, and 8b). Although only a single key is shown in the drawings, the body portion 74 includes three keys 118 spaced equi-angularly about the inner peripheral surface 110 of the body portion 74, and the retractable portion 82 includes three keyways 122 spaced equi-angularly about the outer peripheral surface 106 of the retractable portion 82. Further, in the illustrated construction of the fuel cap 62, the guide members 114 are positioned adjacent the keyways 122 in the retractable portion 82 (see FIG. 2). Alternatively, the body portion 74 and retractable portion 82 may utilize more or fewer than three mating keys 118 and keyways 122, and the keyways 122 may be spaced from the guide members 114.

With reference to FIGS. 2, 3, 8a, and 8b, each of the keyways 122 opens up to a recess 126 formed in the outer peripheral surface 106 of the retractable portion 82. In the illustrated construction of the fuel cap 62, each recess 126 extends upwardly from its respective keyway 122 toward an upper surface 130 of the retractable portion 82. Alternatively, each recess 126 may terminate before reaching the upper surface 130 of the retractable portion 82, such that the recess 126 is not exposed to the upper surface 130 of the retractable portion 82. In addition, each recess 126 is formed with a raised portion 134 adjacent the respective keyway 122 opening up into the recess 126.

Figure 3:
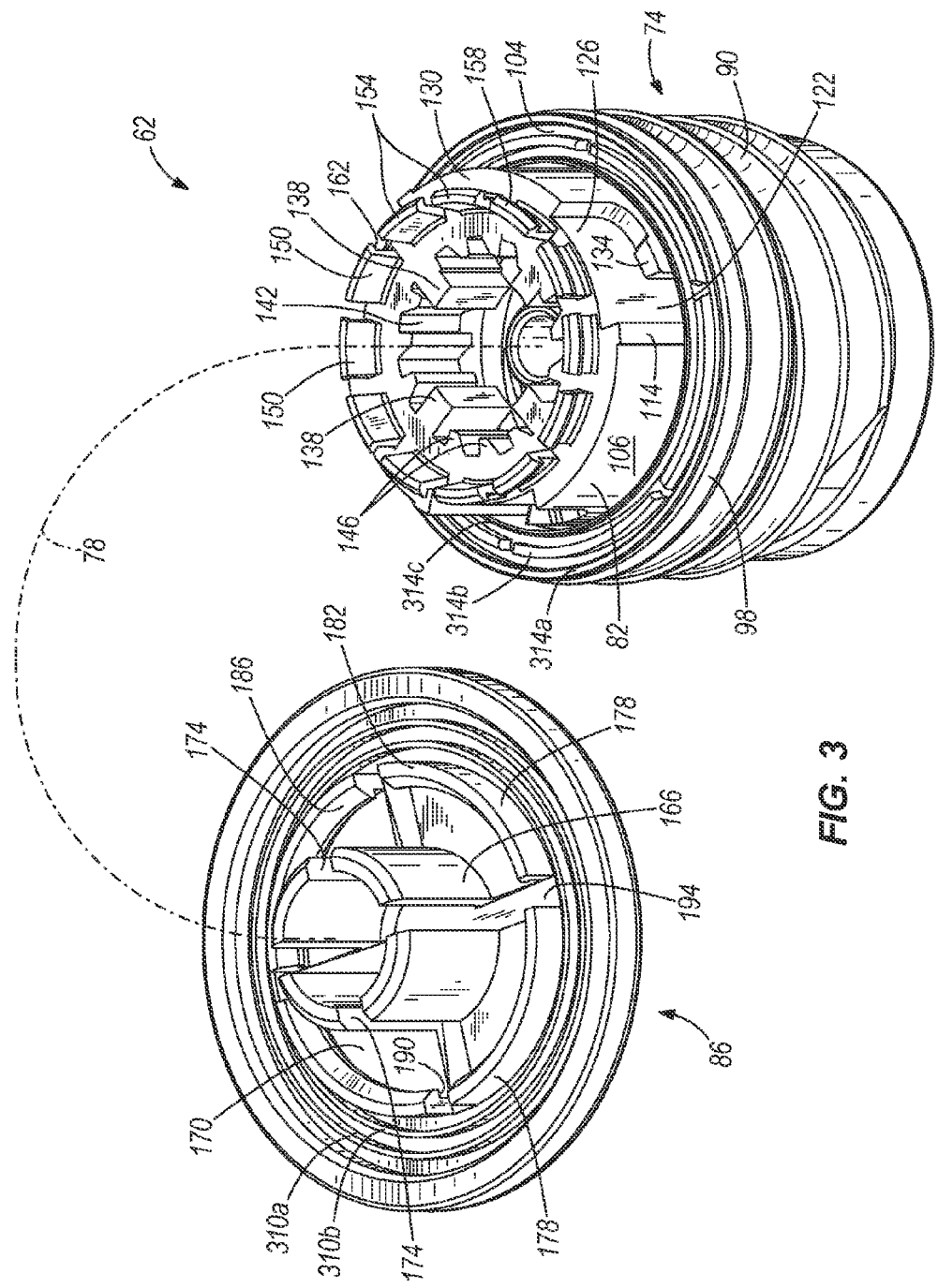
FIG. 3 is a partially-assembled view of the fuel cap of FIG. 2.

With reference to FIG. 3, multiple structures for coupling the cap cover 86 to the retractable portion 82 are shown. The retractable portion 82 includes a plurality of axially-extending projections 138 extending from an inner peripheral surface 142 of the retractable portion 82 radially inwardly toward the central axis 78. The retractable portion 82 also includes, between respective projections 138, a plurality of guide members 146 extending from the inner peripheral surface 142 of the retractable portion 82 radially inwardly toward the central axis 78. As shown in FIG. 3, the projections 138 extend further radially inwardly than the guide members 146. In the illustrated construction of the fuel cap 62, the retractable portion 82 utilizes four equi-angularly spaced projections 138, and three guide members 146 between each projection 138. Alternatively, the retractable portion 82 may utilize more or fewer than four projections 138, and more or fewer than three guide members 146 between respective projections 138.

With continued reference to FIG. 3, the retractable portion 82 includes a plurality of arcuate tabs 150 extending upwardly from the upper surface 130 of the retractable portion 82. The tabs 150 are substantially equally spaced from one another by a gap G2 (see FIG. 4), the significance of which is described below. Each of the tabs 150 at their distal ends includes a ramp portion 154 having an inclined surface 158 relative to the upper surface 130 of the retractable portion 82 and an abutment surface 162 substantially parallel with the upper surface 130.

The cap cover 86 includes an axially-extending receiving portion 166 extending from a bottom surface 170 of the cap cover 86. As shown in FIG. 3, the receiving portion 166 has a substantially cylindrical shape and a plurality of axially-extending slots 174 formed therein. Each of the slots 174 extends from the bottom surface 170 of the cap cover 86 to the distal end of the receiving portion 166, the significance of which is described below. In the illustrated construction of the fuel cap 62, the cap cover 86 utilizes four equi-angularly spaced slots 174 corresponding with the four projections 138 on the retractable portion 82. Alternatively, more or fewer than four slots 174 may be utilized in the receiving portion 166 of the cap cover 86, depending on the number of projections 138 utilized on the retractable portion 82.

Figure 4:
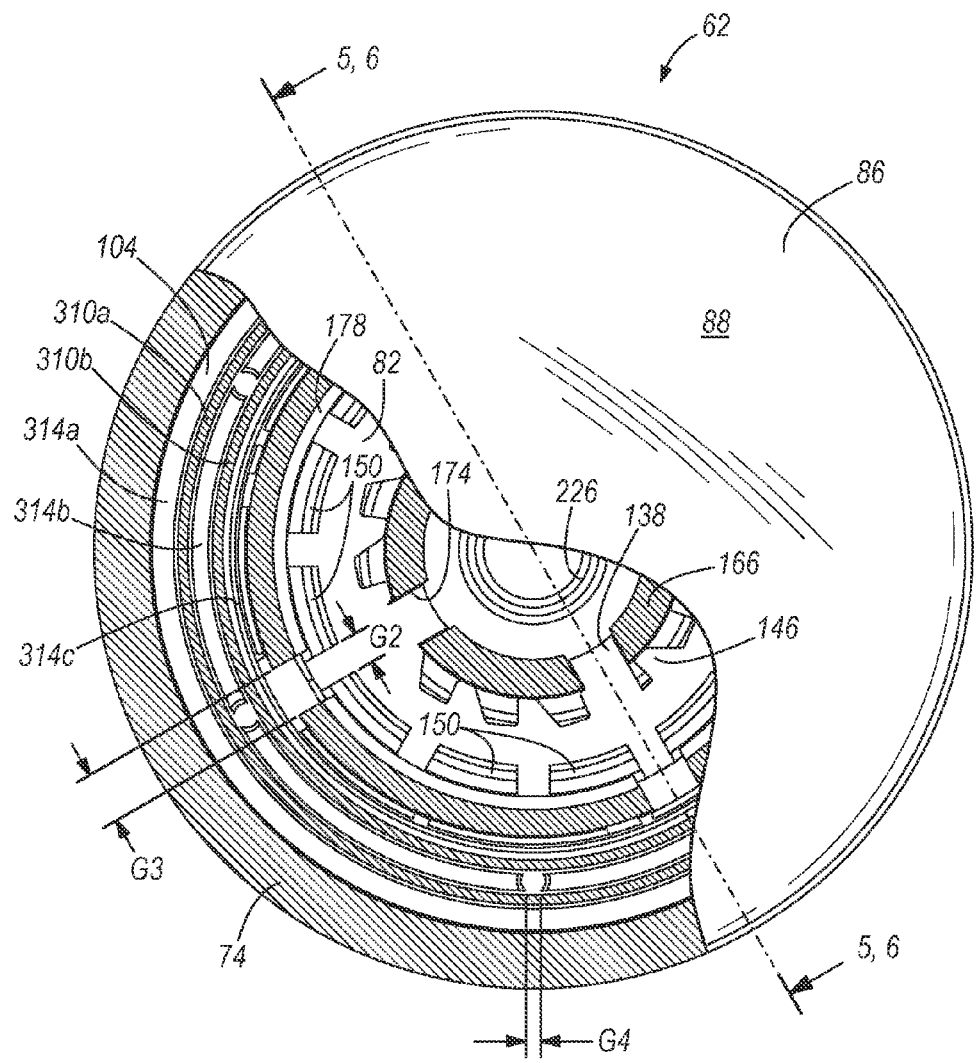
FIG. 4 is an assembled top view of the fuel cap of FIG. 2, including a partial cutaway through a cap cover of the fuel cap.

With continued reference to FIG. 3, the cap cover 86 also includes a plurality of arcuate tabs 178 extending from the bottom surface 170 of the cap cover 86. Like the tabs 150 on the retractable portion 82, each of the arcuate tabs 178 at their distal ends includes a ramp portion 182 having an inclined surface 186 relative to the bottom surface 170 of the cap cover 86 and an abutment surface 190 substantially parallel with a plane normal to the central axis 78. In the illustrated construction of the fuel cap 62, the cap cover 86 includes four equi-angularly spaced arcuate tabs 178. Each of the tabs 178 is separated by a gap G3 substantially corresponding with the width of the slots 174 in the receiving portion 166 (see FIG. 4). Further, as shown in FIGS. 3 and 4, the gaps G3 are substantially aligned with the slots 174 in the receiving portion 166, and shallow channels or grooves 194 formed in the bottom surface 170 of the cap cover 86 connect the slots 174 to the respective gaps G3.

With reference to FIGS. 2, 5, and 6, the fuel cap 62 includes a valve assembly 198 positioned substantially within the body portion 74. The valve assembly 198 includes a valve 202 positioned near a bottom end 206 of the body portion 74. In the illustrated construction of the fuel cap 62, the valve 202 is configured as a one-way valve 202 to allow "replacement air" to enter the fuel tank 42 as fuel in the fuel tank 42 is consumed, while substantially preventing liquid fuel or fuel vapor from exiting the fuel tank 42 through the valve 202. As shown in FIGS. 2, 5, and 6, the retractable portion 82 includes a passageway 234 therethrough to receive the valve assembly 198 as the retractable portion 82 nests with the body portion 74. As such, replacement air passes through the passageway 234 before reaching the valve 202.

With reference to FIG. 2, the valve 202 includes a seal 210 and a diaphragm 214 biased against the seal 210 by a coil spring 218. In the illustrated construction of the fuel cap 62, the seal 210 is configured as a substantially flat ring having an inner diameter D3 less than an outer diameter D4 of the diaphragm 214. Alternatively, the one-way valve 202 may have a different configuration than that shown in the drawings.

In the illustrated construction of the fuel cap 62, the valve assembly 198 also includes a valve body 222 having an upwardly-extending conduit or "snorkel" 226 (see FIGS. 2, 5, and 6). The valve assembly 198 further includes a bottom cover 230 supporting the valve 202 and valve body 222 in the body portion 74. With reference to FIGS. 5 and 6, the bottom cover 230 includes a cylindrical receiving portion 234 having a circumferential groove 238 extending around an inner periphery of the receiving portion 234. The lower end of the valve body 222 includes a lip 246 extending around an outer periphery of the lower end of the valve body 222. The lower end of the valve body 222 is received within the receiving portion 234, and the valve body 222 is secured to the bottom cover 230 by engaging the lip 246 and groove 238. Alternatively, different structure may be utilized to secure the bottom cover 230 to the valve body 222.

With continued reference to FIGS. 5 and 6, the seal 210 is sandwiched between the valve body 222 and a lip 250 extending radially inwardly from the inner periphery of the receiving portion 234. The diaphragm 214, in turn, is positioned between the seal 210 and a spring perch 254 formed in the bottom cover 230. As shown in FIGS. 5 and 6, the coil spring 218 is positioned in the spring perch 254 and biases the diaphragm 214 against the seal 210. The bottom cover 230 includes a plurality of apertures 258 surrounding the spring perch 254.

With reference to FIGS. 2, 5, and 6, the bottom cover 230 also includes a circumferential groove 262 configured to receive a seal (e.g., an O-ring 266) for sealing the bottom cover 230 against the body portion 74, and a plurality of arcuate tabs 270 having respective ramp portions 274 to engage respective lip portions 278 extending radially inwardly from the inner peripheral surface 110 of the body portion 74. Alternatively, multiple portions of the valve assembly 198, including the valve body 222, seal 210, and the bottom cover 230, or any combination thereof, may be integrally formed as one piece rather than providing each portion separately.

With continued reference to FIGS. 2, 5, and 6, a coil spring 282 is positioned between the valve body 222 and the retractable portion 82 to bias the retractable portion 82 upwardly and in a direction away from the one-way valve 202. Particularly, a lower end of the spring 282 is supported on a spring perch 286 formed on the valve body 222, while an upper end of the spring 282 is supported within a cylindrical groove 290 formed in an interior surface of the retractable portion 82 facing the spring perch 286 on the valve body 222.

With reference to FIG. 2, the valve assembly 198 may be pre-assembled before being coupled to the body portion 74. To pre-assemble the valve assembly 198, the coil spring 218 is first lowered into the spring perch 254 on the bottom cover 230, the diaphragm 214 is then lowered onto the coil spring 218, the seal 210 is next lowered onto the lip 250 in the receiving portion 234 of the bottom cover 230, and finally the valve body 222 is inserted into the receiving portion 234 to engage the lip 246 and the groove 238 as described above. The O-ring 266 may be positioned in the groove 262 in the bottom cover 230 as either the first or last step in the pre-assembly of the valve assembly 198. The valve assembly 198 is then fully unitized and may be handled as one piece.

To complete the assembly of the fuel cap 62, the retractable portion 82 is inserted into the body portion 74 through the bottom end 206 of the body portion 74. The retractable portion 82 may be oriented such that the keyways 122 align with the keys 118 on the body portion 74 to allow the retractable portion 82 to slide upwardly to its extended position. The coil spring 282 may then be inserted into the retractable portion 82 such that the upper end of the spring 282 sits in the cylindrical groove 290. The valve assembly 198 may then be inserted into the body portion 74 and coupled to the body portion 74 by engaging the tabs 270 on the bottom cover 230 and the lip portions 278 on the body portion 74.

Finally, the cap cover 86 may be coupled with the retractable portion 82. When coupling the cap cover 86 and the retractable portion 82, the cap cover 86 is first oriented such that the slots 174 in the receiving portion 166 are aligned with the corresponding projections 138 on the retractable portion 82. The receiving portion 166 is then pressed axially into the retractable portion 82, causing the projections 138 to slide through the slots 174, during which time the guide members 146 engage an outer peripheral surface of the receiving portion 166 to provide additional alignment and support of the receiving portion 166 in the retractable portion 82. Continued insertion of the receiving portion 166 into the retractable portion 82 causes the respective inclined surfaces 158, 186 of the arcuate tabs 150, 178 to engage each other, further causing the tabs 150 on the retractable portion 82 to deflect radially inwardly. Upon completion of the insertion of the receiving portion 166 into the retractable portion 82, the tabs 150 snap back to their undeformed shape to allow the respective abutment surfaces 162, 190 of the tabs 150, 178 to engage each other, thereby preventing the cap cover 86 from being disengaged or removed from the retractable portion 82.

With reference to FIGS. 5 and 6, the valve assembly 198 generally includes an upstream chamber 294 and a downstream chamber 298 separated by the one-way valve 202. As previously discussed, the one-way valve 202 selectively allows replacement air to pass through the fuel inlet 58 and enter the fuel tank 42 as fuel is consumed. More specifically, replacement air will enter the fuel tank 42 when the pressure differential between the upstream chamber 294 and downstream chamber 298 is large enough to overcome the tension in the coil spring 218, therefore causing the diaphragm 214 to move axially downwardly and unseat from the seal 210. After the pressure in the upstream and downstream chambers 294, 298 in the valve assembly 198 equalizes, the tension in the spring 218 will re-seat the diaphragm 214 against the seal 210. As shown in FIGS. 5 and 6, the snorkel 226 draws such replacement air through an inlet 302 located above the upper end 104 of the body portion 74.

A combination of features on the cap cover 86 and retractable portion 82 combine to establish a labyrinth or a tortuous passageway through which replacement air must pass before reaching the inlet 302 of the snorkel 226. With reference to FIG. 3, a combination of a plurality of concentric walls 310a, 310b extending from the bottom surface 170 of the cap cover 86 and a plurality of concentric walls 314a, 314b, 314c on the upper end 104 of the body portion 74 form a portion of the tortuous passageway. Particularly, the intermediate wall 314b includes a plurality of equi-angularly spaced gaps G4 (see FIG. 4) through which replacement air may pass.

With reference to FIG. 6, the intermediate wall 314b on the body portion 74 fits between the concentric walls 310a, 310b on the cap cover 86 when the retractable portion 82 and cap cover 86 are moved to the retracted position. In other words, the distal ends of the concentric walls 310a, 310b on the cap cover 86 are positioned below the distal ends of the concentric walls 314a, 314b, 314c on the body portion 74, thereby creating multiple concentric channels 318a-318d through which replacement air may pass in succession, from the radially-outermost channel 318a to the radially-innermost channel 318d (see FIG. 7). Replacement air may also pass from channel 318b to channel 318d via the gaps G4 (see FIG. 4).

After passing through the channels 318a-318d in succession, the replacement air may pass through the gaps G3 between the arcuate tabs 178 and those gaps G2 between the arcuate tabs 150 that are aligned with the gaps G3 (see FIG. 4). As shown in FIGS. 3 and 7, the grooves 194 formed in the bottom surface 170 of the cap cover 86 communicate the radially-innermost channel 318d created by the inter-engagement or nesting of the walls 310a, 310b, 314a, 314b, 314c with the interior of the receiving portion 166. The inlet 302 of the snorkel 226 is exposed to the interior of the receiving portion 166 to draw replacement air from the interior of the receiving portion 166. In summary, the tortuous passageway traveled by the replacement air requires the replacement air to pass through the channels 318a-318d in succession, from the radially-outermost channel 318a to the radially-innermost channel 318d, through the aligned gaps G3 and G2, and through the slots 174 in the receiving portion 166 before reaching the interior of the receiving portion 166, where the replacement air can be drawn through the inlet 302 of the snorkel 226 when it is needed. FIG. 7 illustrates replacement air, indicated by arrow A, traveling through the tortuous passageway, down the snorkel 226, through the one-way valve 202, through the apertures 258 in the bottom cover 230 of the fuel cap 62, and into the fuel tank 42.

With continued reference to FIG. 7, the fuel cap 62 is shown in its retracted position closing the fuel inlet 58 of the fuel tank 42. In its retracted position, the upper surface 88 of the cap cover 86 generally follows the contour of the bezel 70, or alternatively the contour of the upper surface 66 of the fuel tank 42, to provide the flush mount style. As shown in FIG. 7, the inlet 302 of the snorkel 226 is positioned above the upper surface 66 of the fuel tank 42 to draw replacement air from a location above the upper surface 66 of the fuel tank 42. As a result, liquid runoff (e.g., rain) on the upper surface 66 of the fuel tank 42 is substantially prevented from draining into the snorkel 226, and subsequently being introduced into the fuel tank 42 with replacement air. The labyrinth or tortuous passageway created by the channels 318a-318d, the gaps G2, G3, and the slots 174 in the receiving portion 166 increases the difficulty of the runoff from being introduced into the interior of the receiving portion 166, while positioning the inlet 302 of the snorkel 226 at a level above the upper surface 66 of the fuel tank 42 increases the difficulty of the runoff from draining into the snorkel 226 from the interior of the receiving portion 166. Should any runoff leak through the tortuous passageway and into the interior of the receiving portion 166, most likely it will drain to the bottom of the body portion 74 and collect or pool between the body portion 74 and the valve assembly 198. Any collected liquid runoff can be drained from the fuel cap 62 by removing the fuel cap 62 from the fuel inlet 58 and inverting the fuel cap 62 to allow the liquid runoff to drain through the radial gap G1 between the inner peripheral surface 110 of the body portion 74 and the outer peripheral surface 106 of the retractable portion 82.

With reference to FIG. 8a, to remove the fuel cap 62 from the fuel inlet 58, the fuel cap 62 must first be actuated to its extended position. To accomplish this, from the fuel cap's retracted position, the cap cover 86 is first depressed downwardly against the bias of the coil spring 282 to disengage the respective raised portions 134 adjacent each recess 126 from the respective radially inwardly-extending keys 118 on the body portion 74. Then, as shown in FIG. 8b, the cap cover 86 is rotated in a counter-clockwise direction a relatively small amount (e.g., by about 10 degrees) to align the keys 118 with the respective keyways 122 in the retractable portion 82. Then, as shown in FIG. 8c, once the keys 118 and keyways 122 are aligned the bias of the coil spring 282 against the retractable portion 82 causes the retractable portion 82 to extend upwardly until respective end surfaces 322 of the keyways 122 (see also FIG. 3) come into abutment with the keys 118. The fuel cap 62 may then be unscrewed and removed from the fuel inlet 58.

To re-install the fuel cap 62, the fuel cap 62 is first screwed into the fuel inlet 58 until the O-ring 98 seals the body portion 74 against the fuel inlet 58. Then, the cap cover 86 is depressed downwardly against the bias of the coil spring 282 until the raised portions 134 adjacent each recess 126 are below the respective keys 118 on the body portion 74. The cap cover 86 is then rotated in a clockwise direction a relatively small amount (e.g., by about 10 degrees) to move the keyways 122 in the retractable portion 82 out of alignment with the respective keys 118 on the body portion 74, then the cap cover 86 is released. The raised portions 134 adjacent each recess 126 maintain each key 118 in its respective recess 126, and substantially prevent unintentional counter-clockwise rotation of the cap cover 86 to maintain the fuel cap 62 in its refracted position.

Various features of the invention are set forth in the following claims.

What is claimed is:

1. A fuel cap removably engageable with a fuel tank to close an inlet of the fuel tank, the fuel cap comprising:
   a body portion adapted to engage the inlet of the fuel tank, the body portion defining a central axis;
   a cap cover coupled to the body portion and movable along the central axis relative to the body portion between an extended position that facilitates manipulation of the cap cover when removing or installing the fuel cap and a retracted position that inhibits manipulation of the cap cover;

a first cylindrical wall extending from the cap cover; and a second cylindrical wall extending from the body portion concentric with the first cylindrical wall, wherein a distal end of the first cylindrical wall is positioned below a distal end of the second cylindrical wall when the cap cover is in the retracted position to thereby define a tortuous passageway between the first and second cylindrical walls.

2. The fuel cap of claim 1, further comprising a valve coupled to the body portion, the valve selectively allowing an airflow through the body portion, wherein the body portion includes a first end and a second end opposite the first end, wherein the valve is positioned adjacent the first end, and wherein the cap cover is coupled to the second end of the body portion.

3. The fuel cap of claim 1, further comprising a valve coupled to the body portion, the valve selectively allowing an airflow through the body portion; and a conduit coupled to the body portion and positioned between the valve and the cap cover, wherein the airflow passes through the conduit before passing through the valve.

4. The fuel cap of claim 3, wherein the conduit includes an inlet through which the airflow passes to enter the conduit, and wherein the inlet is positioned above an upper surface of the body portion.

5. The fuel cap of claim 4, wherein the valve selectively allows the airflow through the body portion in only a single, inward direction.

6. The fuel cap of claim 1, further comprising a valve coupled to the body portion, the valve selectively allowing an airflow through the body portion in only a single, inward direction, wherein the fuel cap further includes a movable portion coupled to the body portion and movable with the cap cover along the central axis relative to the body portion between the extended position, in which at least a portion of the movable portion is positioned outside the body portion, and the retracted position, in which the movable portion is positioned inside the body portion, wherein the movable portion has a passageway therethrough, and wherein the airflow passes through the passageway of the movable portion.

7. The fuel cap of claim 6, further comprising a spring positioned in the body portion, wherein the cap cover is movable with the movable portion along the central axis from the extended position to the retracted position against the bias of the spring.

8. The fuel cap of claim 1, further comprising a movable portion coupled to the body portion and movable along the central axis with the cap cover relative to the body portion between the extended and retracted positions, the movable portion having a passageway therethrough, a keyway parallel with the central axis in an outer peripheral surface of the movable portion, the body portion including a key being positioned in the keyway when the movable portion is in the extended position, and a recess opening into the keyway, the key being positioned in the recess to maintain the movable portion in the retracted position.

9. A fuel cap removably engageable with a fuel tank to close an inlet of the fuel tank, the fuel cap comprising:

a body portion adapted to engage the inlet of the fuel tank, the body portion defining a central axis and including a radially inward projecting key;

a movable portion coupled to the body portion and movable along the central axis relative to the body portion between an extended position, in which at least a portion of the movable portion is positioned outside the body portion, and a retracted position, in which the movable portion is positioned inside the body portion, the movable portion having a passageway therethrough, a keyway parallel with the central axis in an outer peripheral surface of the movable portion, the key being positioned in the keyway when the movable portion is in the extended position, and a recess opening into the keyway, the key being positioned in the recess to maintain the movable portion in the retracted position; and a cap cover movable with the movable portion along the central axis relative to the body between the extended position, to facilitate manipulation of the cap cover when removing or installing the fuel cap, and the retracted position, to inhibit manipulation of the cap cover.

10. The fuel cap of claim 9, wherein the movable portion is rotatable a limited extent relative to the body portion when moving the movable portion from the retracted position to the extended position.

11. The fuel cap of claim 10, further comprising a raised portion on the movable portion adjacent the keyway and the recess, wherein the key is engageable with the raised portion to inhibit movement from the retracted position to the extended position.

12. The fuel cap of claim 9, further comprising a valve coupled to the body portion, the valve selectively allowing an airflow through the body portion and the passageway of the movable portion only in a single, inward direction.

13. The fuel cap of claim 12, further comprising a conduit coupled to the body portion and positioned within the passageway of the movable portion, wherein the conduit includes an inlet through which the airflow passes to enter the conduit, and wherein the inlet is positioned above an upper surface of the body portion.

14. The fuel cap of claim 12, further comprising:

a first cylindrical wall extending from the cap cover; and a second cylindrical wall extending from the body portion concentric with the first cylindrical wall, wherein a distal end of the first cylindrical wall is positioned below a distal end of the second cylindrical wall when the cap cover is in the retracted position to thereby define a tortuous passageway between the first and second cylindrical walls, and wherein the airflow passes through the tortuous passageway before passing through the valve when the cap cover is in the retracted position.

15. The fuel cap of claim 9, further comprising a spring positioned in the body portion, wherein the movable portion is movable relative to the body portion along the central axis from the extended position to the retracted position against the bias of the spring.

16. A fuel tank assembly comprising:

a fuel tank including a fuel inlet in an upper surface of the fuel tank;

a fuel cap removably engageable with the fuel inlet, the fuel cap including a valve for selectively allowing an airflow through the fuel cap in only a single, inward direction; and a conduit coupled to the fuel cap, the conduit having an inlet through which the airflow passes to enter the conduit, wherein the airflow passes through the conduit before passing through the valve, and wherein the valve is positioned below the upper surface of the fuel tank and the inlet is positioned above the upper surface of the fuel tank when the fuel cap is engaged with the fuel inlet.

17. The fuel tank assembly of claim 16, wherein the fuel cap includes
- a body portion engageable with the fuel inlet, the body portion defining a central axis; and
- a cap cover coupled to the body portion and movable along the central axis relative to the body portion, wherein the valve is coupled to the body portion and selectively allows the airflow through the body portion.

18. The fuel tank assembly of claim 17, wherein the body portion includes a first end and a second end opposite the first end, wherein the valve is positioned adjacent the first end, and wherein the cap cover is coupled to the second end of the body portion.

19. The fuel tank assembly of claim 17, further comprising a tortuous passageway through at least one of the cap cover and the body portion, wherein the airflow passes through the tortuous passageway before passing through the valve when the cap cover is in the retracted position.

20. The fuel tank assembly of claim 19, further comprising a first cylindrical wall extending from the cap cover and a second cylindrical wall extending from the body portion concentric with the first cylindrical wall, wherein the tortuous passageway is formed between the first and second cylindrical walls when the cap cover is in the retracted position.

21. The fuel tank assembly of claim 17, further comprising a movable portion coupled to the body portion and movable along the central axis with the cap cover relative to the body portion between the extended and retracted positions, the movable portion having
- a passageway therethrough,
- a keyway parallel with the central axis in an outer peripheral surface of the movable portion, the body portion including a key being positioned in the keyway when the movable portion is in the extended position, and
- a recess opening into the keyway, the key being positioned in the recess to maintain the movable portion in the retracted position.

* * * * *